Nov. 27, 1951     F. L. YERZLEY     2,576,271
SHOCK AND VIBRATION INSULATOR
Original Filed May 20, 1943
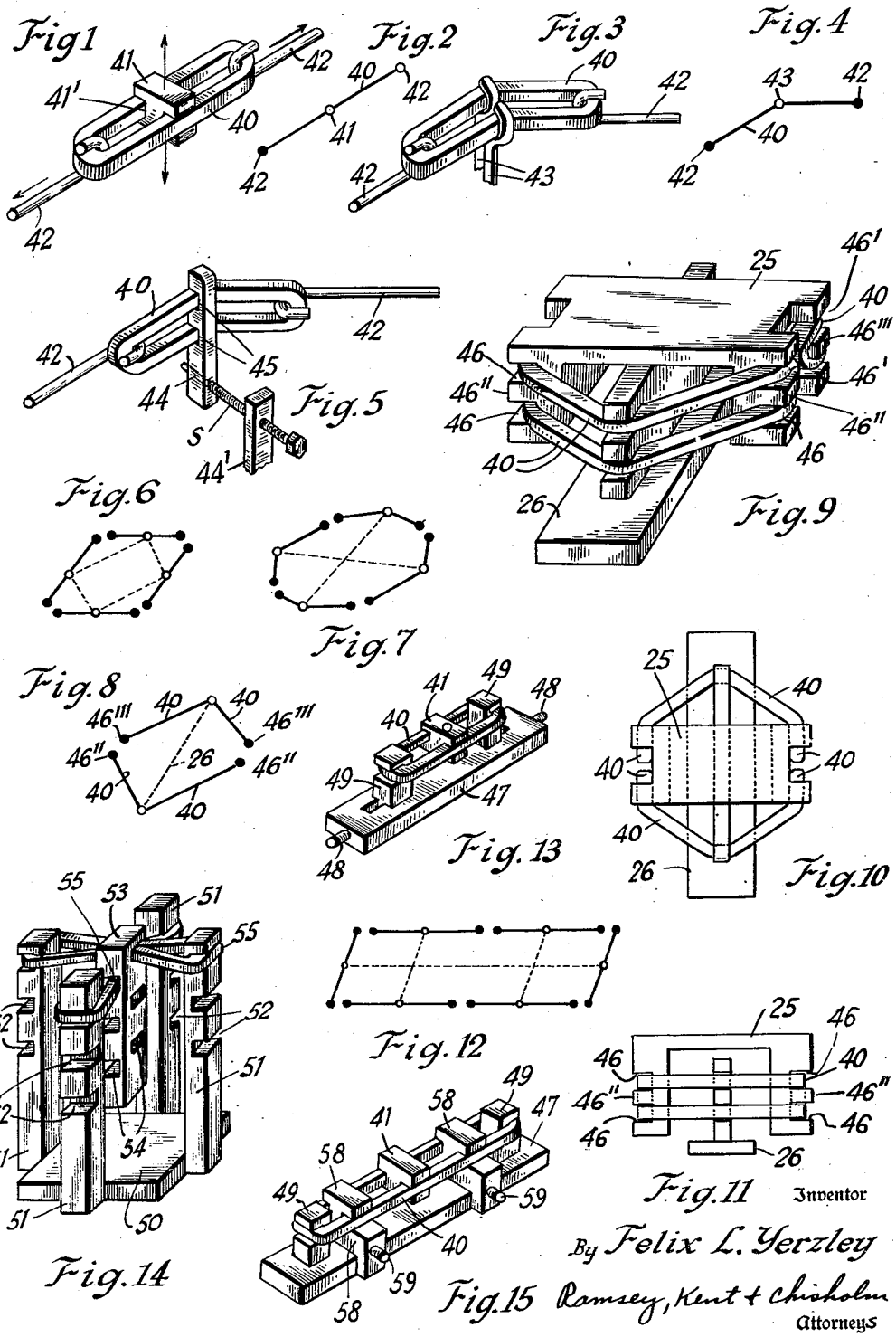

Patented Nov. 27, 1951

2,576,271

UNITED STATES PATENT OFFICE 2,576,271

SHOCK AND VIBRATION INSULATOR

Felix L. Yerzley, Verona, N. J.

Original application May 20, 1943, Serial No. 487,798, now Patent No. 2,415,983, dated February 18, 1947. Divided and this application October 17, 1946, Serial No. 703,903.

13 Claims. (Cl. 248—358)

This invention is concerned with devices in the nature of shock and vibration insulators, such as may constitute or be parts of the connections between supporting elements on the one hand, e. g., an instrument board in an airplane, and an element carried by such board, e. g., one of the navigation instruments. Devices of this kind are shown and described in my Patent 2,353,952, issued July 16, 1944; also in my co-pending application Serial No. 487,798, filed May 20, 1943, now Patent 2,415,983, of which this is a division.

It is an object of the present invention to utilize as I believe, more fully, in the design of devices for the general purposes set forth, the special qualities of rubber that lend themselves to the accomplishment of those purposes. And particularly I aim to utilize the fact that the fatigue life of a length of rubber, normally slack between end supports, if repeatedly subjected to shear deformation stresses by a load applied perpendicular to the length intermediate the supports, will have a relatively short fatigue life, as compared with a similar length that is initially and constantly under tension and in other respects subjected to the same treatment.

Other objects and aims of the invention will appear in the course of the following description, taken in connection with the drawings forming a part thereof.

In the drawings,

Fig. 1 illustrates in perspective an arrangement in which an endless band (or it may be a single stretch of rubber) is kept under tension between two supporting and/or relatively movable hooks or other suitable fastening means engaging the ends of the rubber, and a block is mounted on the rubber intermediate the hooks to which block load or force is applied, as for example in the direction or directions of the arrows, for bringing about shear deformation in the rubber;

Fig. 2 illustrates in diagram the subject-matter of Fig. 1;

Fig. 3 shows an element derived from Fig. 1; the length of rubber, whether there is a single strip or the parallel courses of an endless band as shown, is bent to give it an angular formation useful in embodiments like, for example, Figs. 7 and 8;

Fig. 4 is a diagrammatic representation of the subject-matter of Fig. 3;

Fig. 5 is similar to Fig. 3; except that the courses of the band are disposed one above the other in vertical planes;

Figs. 6 and 12 illustrate in diagram the application of a plurality of Fig. 1 devices to make up a mount for a radio chassis or the like;

Figs. 7 and 8 illustrate in diagram arrangements similar to Fig. 6 made up of elements like Fig. 3 or 5;

Fig. 9 illustrates in perspective an adaptation of the device of Fig. 5, but modified to accommodate a plurality of rubber bands such as shown in Fig. 8;

Figs. 10 and 11 show the Fig. 9 device in top plan view and front elevation respectively;

Fig. 13 illustrates in perspective an adaptation of the Fig. 1 element, with means for regulating the tension of the rubber element;

Fig. 14 is a perspective view showing a variation of the Fig. 1 arrangement whereby the relatively movable elements may accommodate and be connected by a plurality of the rubber connectors arranged vertically one above the other;

Fig. 15 illustrates in perspective a modification of the devices shown in Fig. 1, which could also be adapted to the structures of Figs. 3, 5, 9, 13 or 14, whereby the effective length of a rubber band or strip may be varied without changing its actual length or overall tension.

In Fig. 1 there is a sort of saddle 41 provided with side grooves 41' to accommodate the intermediate portions of the courses of the stretched ring or band 40, load being applied to the saddle 41 and causing it to move as indicated by the arrows, thereby subjecting the rubber to deformation in shear, as will be obvious. Saddle 41 corresponds to element 26 of the relatively movable elements 25—26 in Figs. 9, 10 and 11, and hooks 42 are on the other of such relatively movable elements. It must be remembered, however, that functionally it makes little difference which of the elements 41—42 is considered to be the moving load or force-applying member, and which is the relatively stationary member; they frequently exchange roles in practice.

Fig. 2 illustrates the Fig. 1 construction in diagram, the black circles in that case representing fixed, or adjustably fixed points of support 42, and the light circle representing the saddle 41.

In Fig. 3 there is shown a stretched rubber ring or band 40 bent into angular form as shown, and there are end supports 42 carried on one relatively movable member (similar to member 25 of relatively movable members 25—26 in Figs. 9, 10 and 11), but the load is applied by means of hooks 43 that engage the rubber at the apex of the angle and that are rigid with the other of the relatively movable members. This particular form of device may be used singly or it may be used in multiple, as shown in Figs. 7 and 8.

Fig. 4 illustrates the Figs. 3 and 5 constructions diagrammatically.

Fig. 5 is similar to Fig. 3 but the courses of the stretched rubber band are in the same vertical planes, as distinguished from the Fig. 3 arrangement where the courses of the band are in the same horizontal plane. In this embodiment the load-applying member 44 may be a single vertical arm provided with spaced notches 45 to engage the respective courses of the stretched rubber band (see Fig. 9).

It will be obvious with respect to both the Fig. 3 and the Fig. 5 constructions that the initial and persisting tension contemplated by my invention may be put into the rubber element by simply moving the end supports 42 further apart as measured along the length of the rubber (see Fig. 13); or, the positions of the end supports being fixed, by changing the angle of the length of rubber by appropriate adjustment of the position of member 43 or 44 with respect to its engagement with the rubber. The latter is diagrammatically illustrated in Fig. 5. Instead of the load being applied directly to member 44, it may be applied to member 44' and communicated therefrom through adjustable screw S which is threaded through member 44'. Thus, screw S serves as a means for regulating the initial and persisting tension imposed on the band 40. It is to be understood that in both Figs. 3 and 5 the supports 42 are attached to one of the movable members, corresponding to member 25 of the relatively movable members 25—26 in Figs. 9, 10 and 11, while the members 43 or 44 (or 44') are rigid with the other one of the relatively movable members.

Figs. 6 and 12 illustrate in diagram the application of a plurality of Fig. 1 devices to make up a mount for a radio chassis or the like, the black circles representing points of support 42 rigid with one relatively movable element corresponding to element 25 of the relatively movable elements 25—26 in Figs. 9, 10 and 11, and the light circles representing points of application of load rigid with the other one of the relatively movable elements.

Figs. 7 and 8 illustrate in diagram arrangements similar to Fig. 6, but made up of elements like Fig. 3 or 5, and here again the black circles represent points of support rigid with one relatively movable member, corresponding to member 25 of relatively movable members 25—26 in Figs. 9, 10 and 11, while the light circles represent points of application of force fixed on the other movable member.

Figs. 9, 10 and 11 illustrate an adaptation of the device of Fig. 5, which utilizes two rubber ring elements such as shown in Fig. 5. In these figures there are two relatively movable members 25 and 26. Member 25 is provided with two pairs of notches 46, 46 and 46, 46 which receive the parallel courses of one rubber ring 40, the ring being engaged over the two projections 46''. Intermediate their ends the two courses of this rubber ring 40 are received by two notches in member 26 as shown. A second rubber ring 40, located on the opposite side of the device, connects members 25 and 26 in like fashion. In Fig. 9 this second rubber ring is largely hidden behind members 25 and 26, but one end portion of it appears at reference character 40. This second ring 40 is engaged over two projections 46''' (one shown) on member 25, and the two courses of the ring are received in two pairs of notches 46', 46' (one pair shown) in member 25. The two courses of the second rubber ring 40 are received by two notches in member 26, the arrangement being similar to that shown for the first rubber ring 40.

Fig. 13 shows a modification of the Fig. 1 device, in which there is a base 47 that corresponds to element 25 of the relatively movable elements 25—26 in Figs. 9, 10 and 11. Adjustable towards and from each other, as by means of adjusting screws 48, 48, is a pair of blocks 49, 49 each provided with a notch to receive a rubber ring 40. By moving the blocks 49, 49 away from each other to the proper extent, the rubber is put under the desired tension and kept in that condition by the fixing of the adjusted position by means of the screws 48, 48. There is a saddle 41 carried by the band which constitutes, or is attached to, the other relatively movable member, corresponding to member 26 of relatively movable members 25—26 in Figs. 9, 10 and 11.

In Fig. 14 there is a base 50 carrying upstanding columnar members 51, four of them arranged in pairs, the members of a pair opposing each other as shown, and each of which members 51 is provided with a plurality of outwardly opening notches 52, and there is another columnar element 53 provided at different levels with through openings 54, successive ones of those openings extending through the piece 53 at right angles to each other. The base 50 will constitute, or be attached to, one movable element like 25 or 26 in Figs. 9, 10 and 11, and the piece 53 will constitute, or be attached to, the other movable element corresponding to the other movable element like 25 or 26. Connection between 53 and the uprights 52 is established by means of a plurality of endless rubber bands 55, which respectively pass through the several openings in the member 53 and have their ends engaged in the corresponding notches in opposed uprights 51, each such endless band being under initial and persisting tension. It is believed that the functioning of this device will be obvious. It has advantages in places where there is ample space vertically but not laterally. And, of course, there is the cumulative effect of utilizing a plurality of rubber elements.

In Fig. 15 there is a base corresponding to base 47 of Fig. 13, and there are end blocks 49 which in this case are shown rigid with the base, though they may be adjustable as in Fig. 13, if desired. These blocks are provided with notches to accommodate the rubber band 40, and there is also a saddle 41 similarly provided with notches to accommodate the rubber band 40. In addition, there are blocks 58, provided with notches to accommodate the rubber band 40, and which are slidable towards and from each other on the base and which may be secured in adjusted position by means of set screws 59. These blocks 58 are two in number, and located, respectively, between the saddle 41 and the adjacent end block 49. Obviously, if the blocks 58 are moved more or less towards each other, they will determine the effective length of the rubber between them, with consequent effects on the spring rate, etc.

The design of springs of the ring-type class demands especially careful attention to details. One of the important factors is the size and proportioning of the rubber ring. The major dimensions of a circular ring are the inner and outer diameters and the thickness. The diameters may be so chosen relative to each other and to the thickness that the ring may appear to be thin or thick, as desired.

The thickness may be so chosen as to provide a thin washer-like ring or be increased to such an extent that the ring becomes in fact a length of tubing, but useful in the design of springs for special cases. For fixed diameters the load-carrying capacity can be increased in direct proportion to the increase in thickness, provided the hooks are correspondingly opened to accommodate the additional thickness. As the thickness is increased with respect to the diameters certain consequences must be recognized and compensated for if necessary. In a spring employing a flat ring of rubber the deformation of the unsupported rubber between hooks is in shear for small deformations, with a tension aspect becoming apparent for larger deformations. The external load is applied to the supporting members and is transmitted to the rubber by a compressive contact between the inner flat surface of the hooks and the area of the supported portion of the ring. If the supporting area of the hooks is larger in comparison with the load, the intensity of the compression forces in the supported portion of the ring is low. Between the supported portions and the unsupported portions the stresses resulting from the applied load change from compression to shear. As in any mechanical assembly of metal or other material involving active forces capable of producing fatigue, complications of stresses are to be avoided in good design. In the ring types of spring disclosed herein the effects of stress transitions are minimized by the initial circumferential tension in the ring, which is at right angles to the shear planes, and by other controllable factors, principally the proportioning of the parts, i. e., design details. As long as the compressive stresses in the supported portion of the rubber can be kept low, there can be no serious stress complications at the boundary with the unsupported sections. However, it is conceivable that complications affecting the serviceability of a spring can occur if the distribution of compressive and shear stresses is not properly controlled.

In compliance with the patent statutes, I have disclosed the best forms in which I have contemplated applying my invention herein claimed. It will be understood, however, that the invention may be embodied in other forms, and that the disclosure of specific forms is to be considered as illustrative and not limiting.

I claim:

1. In an organization for mounting an object on a support and insulating the object from vibration to which the support may be subjected, a length of rubber, adjustable means carried by the support and operative to stretch the length of rubber in the direction of its length and maintaining it in tension, and a member attached to the object and engaging the rubber between its ends for transmitting load from the object to the rubber in a direction perpendicular to its length.

2. A spring element for the purpose set forth, comprising two longitudinally stretched lengths of rubber in generally parallel relationship, means for maintaining said lengths in longitudinally stretched condition, and a saddle between the ends of the lengths, the saddle having a formation accommodating the lengths for transmitting load to and in a direction perpendicular thereto, and the saddle being pressed against both lengths of rubber to give them respectively an angular formation while maintaining their generally parallel relationship.

3. The combination set forth in claim 2 in which the lengths of rubber are disposed in side-by-side position.

4. The combination set forth in claim 2 in which the lengths of rubber are disposed one above the other.

5. Two complemental elements connected by a plurality of peripherally-continuous elongated rubber loops under constant substantial tension, each loop comprising two lengths of rubber secured at at least two points to one element, and means carried by the other element to transmit load to each length and subject it to deformation in shear, such load-transmitting means engaging the lengths of rubber between two points of their attachment to said one element and holding the lengths in angular formations in a plane perpendicular to the direction in which load is applied.

6. In an organization for mounting an object on a support and insulating the object from vibration to which the support may be subjected, a length of rubber, means carried by the support and operative to stretch the rubber in the direction of its length and maintain it under tension, load-applying means attached to the object and engaging the length of rubber between its ends and holding it in an angular formation, and adjustable means for shifting the position of the load-applying means to vary the normal angularity of said angular formation.

7. In an organization for mounting an object on a support and insulating the object from vibration to which the support may be subjected, two complemental members, one of which is attached to the support and is provided with two pairs of columns, the members of each pair being in opposed relationship to each other, all of the columns being provided with outwardly opening notches; and the other complemental member being attached to the object and having a series of through openings vertically spaced and each opening extending at a right angle to its neighbors, and closed loops of rubber under tension disposed in elongated form and extending through the openings in the second named member and having the ends of their elongated formations engaged in the corresponding notches of the corresponding pair of columns of the first named member.

8. In an organization for mounting an object on a support and insulating the object from vibration to which the support may be subjected, two complemental elements one being attached to the support and the other being attached to the object and the two being connected by a plurality of peripherally-continuous elongated rubber loops under constant substantial tension, each loop comprising two lengths of rubber secured at at least two points to one element, and means carried by the other element to transmit load to each length of rubber in a transverse direction, such load-transmitting means engaging the lengths of rubber between two points of their attachment to said one element and holding the lengths in angular formations.

9. In an organization for mounting an object on a support and insulating the object from vibration to which the support may be subjected, a loop of rubber stretched to provide two parallel lengths of rubber maintained under tension, the ends of the lengths being attached to the support, load-applying means attached to the object and engaging both of said lengths of rubber between their ends and holding them in angular formations in planes perpendicular to the direction in which the load is applied, and adjustable means for shifting the position of the load-applying means in a direction perpendicular to the direction in which the load is applied to thereby vary the angularity of said angular formations.

10. In an organization for mounting an object on a support and insulating the object from vibration to which the support may be subjected, two elements one being attached to the support and the other being attached to the object and the two being connected by at least one peripherally-continuous elongated rubber loop under continuing substantial tension, said loop comprising two lengths of rubber secured at at least two points to one element, and means carried by the other element to transmit load to each length in a transverse direction such load-transmitting means engaging the lengths of rubber between two points of their attachment to said one element and holding the lengths in angular formations.

11. An organization as in claim 10, in which the means which engages the lengths of rubber and holds the lengths in angular formations is adjustable to vary the angularity of the angular formations.

12. In an organization for mounting an object on a support and insulating the object from vibration to which the support may be subjected, two complemental members, one being attached to the support and having means for holding a closed loop of rubber in elongated stretched condition to provide generally parallel courses of rubber, and the other being attached to the object and having formations engaging said courses of rubber between their ends and holding the courses displaced into angular formations.

13. The combination set forth in claim 12, in which the one member is provided with means for holding a plurality of closed loops of rubber in elongated stretched condition, in which the other member has notches engaging the courses between their ends, and the angular formations of the courses of the respective loops of rubber open toward each other.

FELIX L. YERZLEY.

REFERENCES CITED

The following references are of record in the file of this patent:

UNITED STATES PATENTS

| Number | Name | Date |
|---|---|---|
| 1,704,570 | Lee et al. | Mar. 5, 1929 |
| 2,235,505 | Ryan | Mar. 18, 1941 |
| 2,353,943 | Storch | June 15, 1944 |
| 2,353,952 | Yerzley | July 18, 1944 |
| 2,415,983 | Yerzley | Feb. 18, 1947 |